US012422879B2

(12) United States Patent
Hörlle

(10) Patent No.: US 12,422,879 B2
(45) Date of Patent: Sep. 23, 2025

(54) FOOT SWITCH DEVICE

(71) Applicant: OLYMPUS WINTER & IBE GMBH, Hamburg (DE)

(72) Inventor: Andreas Hörlle, Berlin (DE)

(73) Assignee: OLYMPUS WINTER & IBE GMBH, Hamburg (DE)

( * ) Notice: Subject to any disclaimer, the term of this patent is extended or adjusted under 35 U.S.C. 154(b) by 0 days.

(21) Appl. No.: 18/414,764

(22) Filed: Jan. 17, 2024

(65) Prior Publication Data

US 2024/0248506 A1 Jul. 25, 2024

Related U.S. Application Data

(60) Provisional application No. 63/440,201, filed on Jan. 20, 2023, provisional application No. 63/439,937, filed on Jan. 19, 2023.

(51) Int. Cl.
*G05G 1/44* (2008.04)

(52) U.S. Cl.
CPC .................................... *G05G 1/44* (2013.01)

(58) Field of Classification Search
None
See application file for complete search history.

(56) References Cited

U.S. PATENT DOCUMENTS 6,608,267 B2 * 8/2003 Fischer .................... H01H 3/14 338/153
10,777,373 B2 9/2020 Lebreton et al.
11,419,697 B2 * 8/2022 Lebreton ................ G05G 1/305

FOREIGN PATENT DOCUMENTS

CN 113216761 A * 8/2021 ........... E05B 53/001
DE 10 2014 106 826 A1 11/2015
DE 102016118602 A1 * 4/2018 ............. H01H 13/16
DE 10 2020 108 700 A1 9/2021
EP 2 134 286 B1 11/2018

OTHER PUBLICATIONS

Jan. 21, 2023 Office Action issued in German Patent Application No. 10 2023 101 485.4.

* cited by examiner

*Primary Examiner* — Vicky A Johnson
(74) *Attorney, Agent, or Firm* — Oliff PLC

(57) ABSTRACT

A foot switch device includes: a housing, a pedal moveably mounted on the housing, a bias element, and a switching device, wherein the pedal is configured to be moveable against a force of the bias element to operate the switching device, and wherein the bias element has a non-linear load deflection curve.

12 Claims, 3 Drawing Sheets

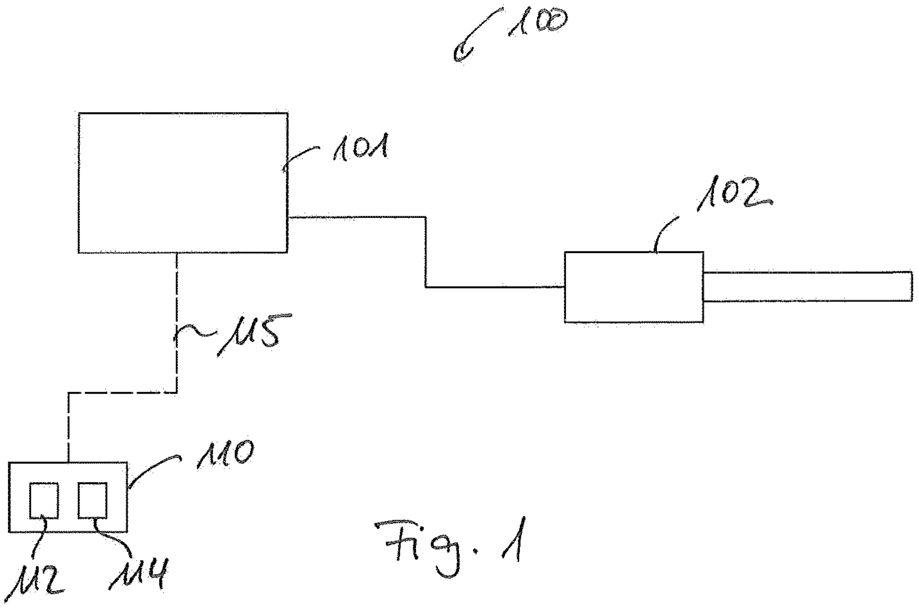
Fig. 1
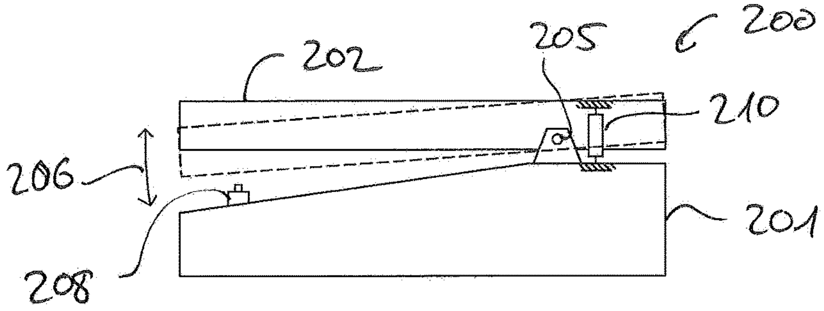
Fig. 2
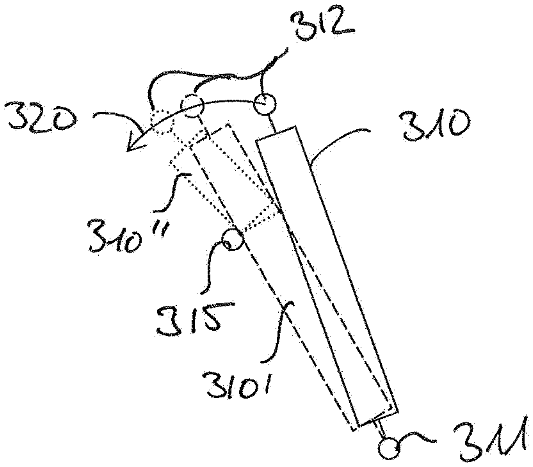
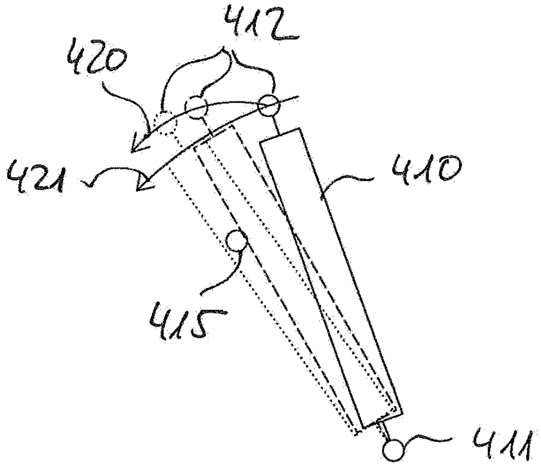
Fig. 3
Fig. 4

500
502
505
511
510
501

500
502
511
510
501

512
502
511
510'
510

FOOT SWITCH DEVICE

FIELD

The present disclosure relates to foot switch devices. More particularly, the present disclosure relates to foot switch devices for use with medical devices, like electrosurgical generators and the like.

BACKGROUND

Foot switch devices are widely used in modem medicine for controlling medical devices like suction or irrigation pumps, imaging devices, and electrosurgical generators. They usually comprise a housing and a number of pedals moveably attached to the housing, so that the pedals can be selectively operated with a foot of a user. Operating the pedals causes activation or deactivation of switches associated with the pedals, and output signals of the switches are communicated to the medical device to be controlled.

Foot switch devices usually comprise a housing, on which one or more pedals are moveably mounted. A bias element is associated with each pedal, so that the pedal is urged into a rest position, from which it can be moved against the force of bias element into a switching position by a user's foot. The force of the bias element usually increases the more the pedal is moved away from the rest position.

In many cases, foot switch devices comprise binary switching elements, which are operated by the pedal when the pedal is moved into the switching position. In some cases, the switch devices comprise proportional switching elements, which are configured to issue a proportional switching signal depending on the position of the pedal.

During use, a user of a foot switch device needs to overcome the force of bias element in order to operate the switching device. For enabling fast operation of the switching device, a user normally first moves the pedal from the rest position to an intermediate position, so that only a small remaining movement is necessary to reach the switching position, and to operate the switching device.

In some use cases, it may be necessary for the user to operate the switching device multiple times within a short period of time, for example to provide electrosurgical energy to and electrosurgical instrument in a controlled manner by repeatedly switching the electrosurgical energy output of an electrosurgical generator on and off. As in this case the user permanently needs to hold the pedal against the force of bias element, operation of the foot switch device may cause fatigue, which is undesirable.

It is therefore an object of the present disclosure to provide a foot switch device with improved performance.

SUMMARY OF THE DISCLOSURE

The present disclosure provides a foot switch device as defined in the appending claims. The foot switch device comprises a housing, a pedal moveably mounted on the housing, a bias element, and a switching device. The pedal is configured to be moveable against a force of the bias element to operate the switching device. According to the present disclosure, the bias element has a non-linear load deflection curve. The pedal may be moveable from a rest position through an intermediate position to a switching position. A force required to move the pedal from the rest position to intermediate position may be higher than a force required to move the pedal from the intermediate position to the switching position. The non-linear load deflection curve of the bias element enables a user to hold the pedal near the switching position with a reduced force, so that fatigue resulting from holding the pedal can be reduced.

In the present disclosure, the term "non-linear load deflection curve" is to be understood as describing the force applied by the bias element in relation to a movement of the pedal. This does not necessarily mean that the bias element itself provides a non-linear load deflection curve without being included in the foot switch device, for example in a test stand. The non-linear load deflection curve may result from the way the bias element is mounted in the foot switch device.

In some embodiments, the switching device may be a binary switching device configured to switch from a first switching state to a second switching state when the pedal is moved into the switching position. The first switching state may be an "on" state. The second switching state may be an "off" state. The switching device may be configured to issue a binary switching signal, which can be used for activating or deactivating a therapeutic function of a medical device to be controlled by the foot switch device.

In some embodiments, the switching device may be a proportional switching device configured to output a switching signal depending on the position of the pedal. The switching device may be configured to issue a proportional switching signal, which can be used for setting one or more parameters of a therapeutic function of the medical device to be controlled by the foot switch device.

In some embodiments, the bias element may comprise a tension spring. The tension spring may be a spiral spring. The spiral spring may have a default length, and may be configured to increase in length when a tensile force is applied to the spiral spring. The pedal may be moveable about a pedal pivot axis, and the tension spring may be mounted between a first fixing point at the housing and a second fixing point at the pedal. The tension spring may extend along a straight line between the first fixing point and the second fixing point when the pedal is moved from the rest position to the intermediate position. The tension spring may be deflected at the pedal pivot axis when the pedal is moved beyond the intermediate position towards the switching position.

In some embodiments, the bias element may comprise a leaf spring. The leaf spring may be a clicker frog spring. The clicker frog spring may have a first configuration and a second configuration. In the first configuration, the clicker frog spring may have a high stiffness. The clicker frog spring may transition from the first configuration to the second configuration in response to a bending force. The clicker frog spring may have a reduced stiffness in the second configuration. The leaf spring may have a V-shaped configuration, with a first arm being fixed to the pedal, a vertex resting on the housing, and a second arm moveably resting on the pedal. Movement of the pedal may compress the leaf spring, causing the V-shape to spread.

In some embodiments, the foot switch device may further comprise a compression spring. The compression spring may be mounted between the pedal and the housing, so that the compression spring is compressed when the pedal of is moved from the rest position towards the intermediate position or the switching position. A force of the compression spring may be lower than a force of the tension spring or the leaf spring when the pedal is moved from the rest position to the intermediate position, and the force of the compression spring may be equal to or higher than the force of the tension spring or the leaf spring when the pedal is moved beyond the intermediate position. The compression spring may be exchangeable, so that the force of the compression spring can be adjusted to the preferences of a user.

The foot switch device may comprise a plurality of pedals attached to the housing. A separate bias element may be associated with each of the plurality of pedals.

BRIEF DESCRIPTION OF THE DRAWINGS

The subject of this disclosure is further described in more detail at hand of some exemplary embodiments and drawings. Such embodiments and drawings are only provided for better understanding the concept of the disclosure, without limiting the scope of protection, which is defined by the appended claims.

The drawings show:

FIG. 1: A medical device system with a foot switch device;

FIG. 2: A sectional view of a foot switch device;

FIG. 3: A schematic view of a bias element in a foot switch device;

FIG. 4: A schematic view of a further bias element in a foot switch device;

DETAILED DESCRIPTION

Figures 5A, 5B, 5C:
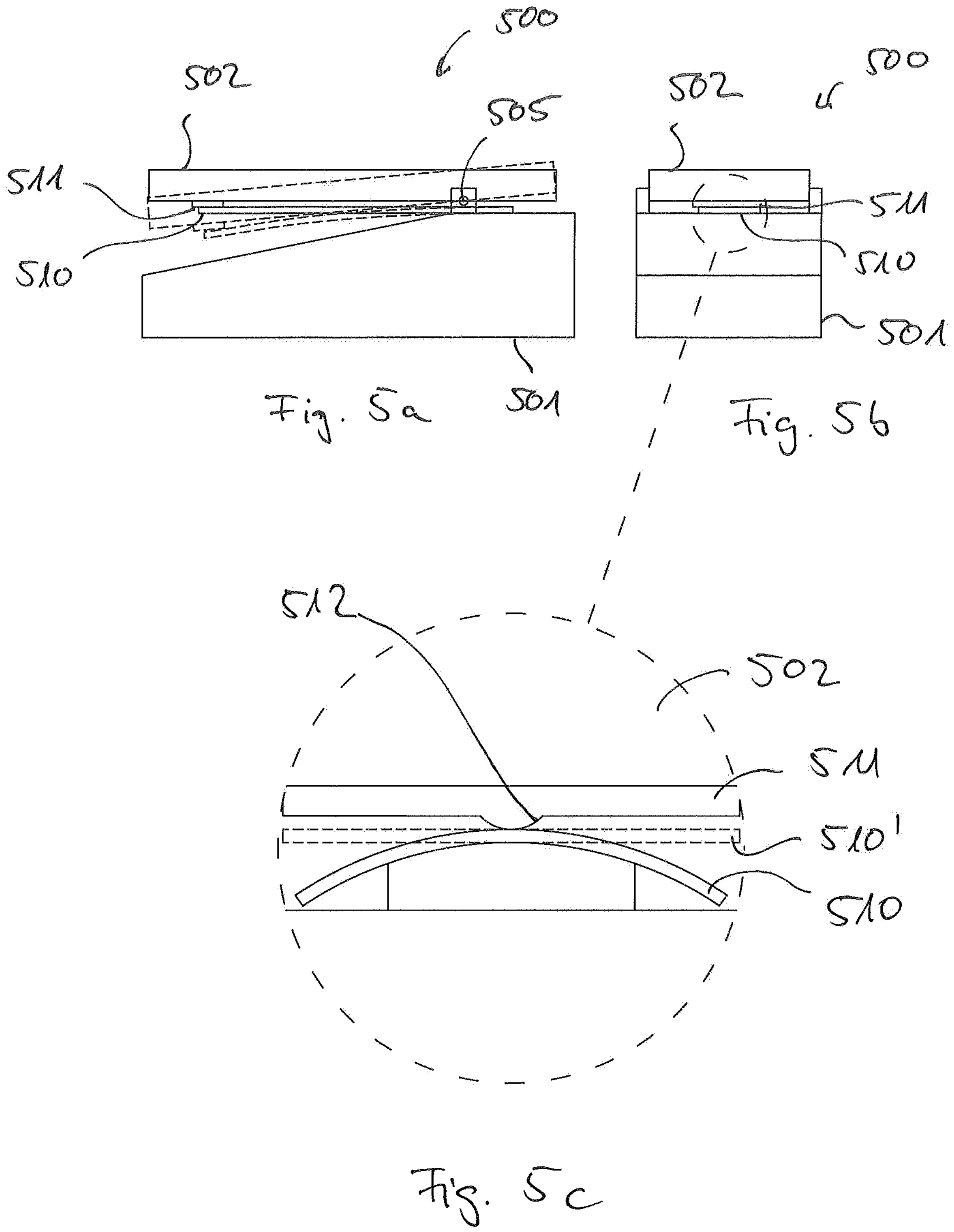
FIG. 5*a-c*: A further foot switch device.

FIG. 1 shows a medical device system 100. Medical device system 100 comprises a medical device 101, which may be an electrosurgical generator. The medical device 101 is connected to a surgical instrument 102, which may be an electrosurgical instrument.

The medical device system 100 further comprises a foot switch device 110, which can be used by a practitioner to control the function of the medical device 101. In the shown example, the foot switch device 110 comprises two pedals 112, 114, which may be used to control the electrosurgical generator 101 to issue different electrosurgical therapy signals to the electrosurgical instrument 102. For example, when a practitioner pushes the left pedal 112, the electrosurgical generator 101 may be controlled to issue a coagulation signal to the electrosurgical instrument 102, and when a practitioner pushes the right pedal 114, the electrosurgical generator 101 may be controlled to issue a cutting signal to the electrosurgical instrument 102.

The foot switch device 110 may communicate with the electrosurgical device 101 through a wireless connection indicated by dashed line 115. Of course, the foot switch device 110 may also be connected to the medical device 101 using a wired connection.

FIG. 2 shows a simplified sectional view of a foot switch device 200. The foot switch device 200 comprises a housing 201 and a pedal 202 moveably mounted on the housing 201. The pedal 202 is mounted on the housing 201 to be moveable about a pedal pivot axis 205. The pedal 202 can be moved by a users foot in the direction of arrow 206 and into contact with a switching device 208.

A bias element 210 is mounted between the housing 201 and the pedal 202. The bias element 210 urges the pedal 202 into a rest position as shown solid lines in FIG. 2. To move the pedal from the rest position to a switching position, where the pedal 202 contacts and operates the switching device 208, the user has to act against the force of the bias element 210.

The bias element 210 is provided with a non-linear load deflection curve, so that a force required to move the pedal 202 from the rest position to an intermediate position, as shown in broken lines in FIG. 2, is higher than a force required to move the pedal 202 from the intermediate position into the switching position (not shown).

FIG. 3 shows an exemplary embodiment of a bias element providing a non-linear load deflection curve. For sake of clarity, FIG. 3 only shows the bias element, which is a tension spring 310, a first fixing point 311, where the tension spring 310 is mounted to the housing, a second fixing point 312, where tension spring 310 is mounted to the pedal, and a pivot axis 315.

FIG. 3 shows how the tension spring 310 moves when the pedal is moved from a rest position through an intermediate position to a switching position. While the first fixing point 311 and the pivot axis 315 remain stationary during movement of the pedal, the second fixing point 312 moves along a circular path around the pivot axis 315, as indicated by arrow 320.

It can be seen that the tension spring 310 is expanded while moving from the rest position to intermediate position, were the tension spring 310 is shown with broken lines. It can further be seen that, in the intermediate position, the tension spring abuts the pivot axis 315. When the pedal is moved beyond the intermediate position, the tension spring 310 can no longer extend along a straight line between the first fixing point 311 and the second fixing point 312. Instead, the tension spring 310 splits up into a first block 310' and a second block 310", indicated by dotted lines, which separate at the pivot axis 315. During movement from the intermediate position to the switching position, the first and second blocks 310', 310" of the tension spring 310 maintain their respective lengths, but are twisted against each other. Such twisting, however, requires much less force than linear expansion of the tension spring 310, so that a force required to move the pedal from the rest position to the intermediate position is higher than a force required to move the pedal from the intermediate position to the switching position.

FIG. 4 shows a further exemplary embodiment of a bias element providing a non-linear load deflection curve. Again, for sake of clarity, only the bias element, which is a tension spring 410, a first fixing point 411 where the tension spring 410 is mounted to the housing, a second fixing point 412 where the tension spring 410 is mounted to the pedal, and the pivot axis 415 are shown.

Other than in the embodiment shown in FIG. 3, the pivot axis 415 allows passing of the tension spring 410 without being deflected. It can be seen that the tension spring 410 is expanded while moving from the rest position to the intermediate position, because the path of the second fixing point 412, as indicated by arrow 420, runs at an angle from a circular line about the first fixing point 411, as indicated by arrow 421. It can further be seen that, when the tension spring 410 moves from the intermediate position to the switching position, the path of second fixing point 412 runs almost parallel to the circular line about the first fixing point 411, so that the tension spring 410 is barely extended any further. As a consequence, a force required to move the pedal from the intermediate position to the switching position is much lower than a force required to move the pedal from the rest position to the intermediate position. As a further effect, as the tension spring 410 moves closer to the pivot axis 415, an effective lever arm of the tension spring decreases, so that a torque acting on the pedal also decreases.

In the embodiment of FIG. 4, it is important that the switching position is reached before the path of the second fixing point 412 reaches a maximum distance from the circular line around the first fixing point 411, because otherwise the tension spring 410 would pull the pedal to us the switching position by itself.

FIGS. 5*a* to 5*c* show a further foot switch device 500. The foot switch device 500 comprises a housing 501 and a pedal 502 moveably mounted on the housing 501. The pedal 502 is moveable about a pedal pivot axis 505 towards a switching device, which is not shown in FIG. 5. A bias element urges the pedal 502 into a rest position. The bias element of the shown embodiment comprises a leaf spring 510. When the pedal 502 is moved from the rest position towards an intermediate position, or a switching position, the leaf spring 510 is deflected, as shown in broken lines in FIG. 5*a*. A sliding block 511 at the lower side of the pedal reduces friction between the pedal 502 and the leaf spring 510.

FIG. 5*b* shows a front view of the foot switch device 500 with the pedal 502 in the rest position. FIG. 5*c* shows a detailed view of the leaf spring 510 and the sliding block 511 shown in FIGS. 5*a* and 5*b*.

It can be seen that the leaf spring 510 has a curved cross-section. Due to the curved cross-section, the leaf spring 510 has a high initial stiffness, so that a high force is required to move the pedal 502 out of the rest position. However, as soon as a certain force is applied, the leaf spring 510 will elastically transform into a flat configuration 510', as shown in broken lines in FIG. 5*c*. Due to this transformation, the stiffness of the leaf spring 510 will significantly decrease, so that much less force is required to move the pedal 502 beyond the position at which the transformation occurs. This kind of transformation is also known as the "clicker frog" effect. To enable friction-free transition of the leaf spring 510 between the curved configuration and the flat configuration, the sliding block 511 has a cam 512, providing point- or line-contact between the sliding block 511 and the leaf spring 510.

Figure 6:
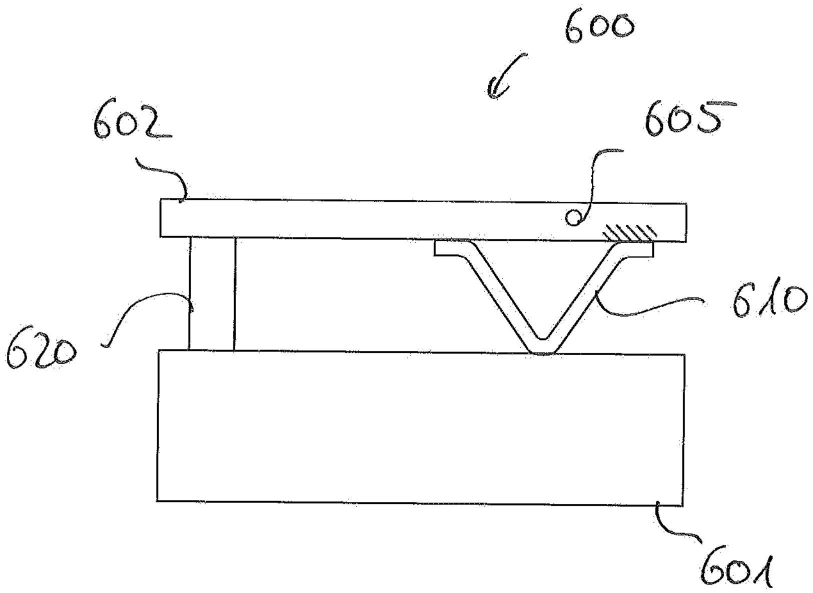
FIG. 6: A further foot switch device.

FIG. 6 shows a further exemplary embodiment of a foot switch device according to the present disclosure. The foot switch device 600 is similar to the foot switch device 500 shown in FIGS. 5*a* to 5*c*.

Other than shown in FIG. 5*a* to 5*c*, the bias element of the foot switch device 600 is a leaf spring 610 with a V-shaped configuration. A first arm of the leaf spring 610 is fixedly attached to the pedal 602 of the foot switch device 600 at a point behind the pivot axis 605. A vertex of the leaf spring 610 rests on the housing 601 at a point close to and in front of the pivot axis 605, and a second arm of the leaf springs 610 rests under the pedal 602 in front of and further away from the pivot axis. The terms "behind" and "in front of" are to be understood as seen by a user of the foot switch device 600.

When the pedal 602 is moved from a rest position towards an intermediate position, the leaf spring 610 is deformed, so that the arms of the leaf spring 610 are spread further apart. During the deformation of the leaf spring 610, the vertex of the leaf spring slides along the surface of the housing 601, and the second arm of the leaf spring 610 slides along a lower surface of the pedal 602. As the first arm of the leaf spring 610 is fixed to the pedal 602 behind the pivot axis, the vertex of the leaf spring 610 slides towards the pivot axis 605 when the pedal is moved away from a rest position. Due to this sliding movement, an effective lever arm of the force of the leaf spring 610 on the pedal 602 decreases, so that a torque acting on the pedal 602 also decreases. Accordingly, an initial force required to move the pedal away from the resting position is high, and then decreases while the pedal 602 is moved towards the intermediate position or the switching position.

In a modification of the embodiment shown in FIG. 6, the leaf spring may be fixed to the pedal with the second arm in front of the pivot axis, and may slidably rest under the pedal with the first arm behind the pivot axis.

Similar to the embodiment of FIGS. 5*a* to 5*c*, the leaf spring 610 may have a curved cross-section to provide the clicker frog effect as previously described.

The foot switch device 600 further comprises an additional bias element, which may be a compression spring 620 between the pedal 602 and the housing 601. The compression spring 620 may be used to further adjust the effective load deflection curve of the leaf spring 610. The compression spring 620 may provide a relatively low force while the pedal 602 is moved from the rest position towards the intermediate position. In particular, the force provided by the compression spring 620 may be lower than the force provided by the leaf spring 610 while the pedal 602 is moved from the rest position to the intermediate position.

As the pedal 602 is moved further towards the switching position, the force provided by the compression spring increases, and may be equal to or higher than the force provided by the leaf spring 610.

While the compression spring 620 is only shown in FIG. 6, a similar compression spring may equally be applied in the embodiments shown in FIGS. 3, 4, and 5*a* to *c*. The compression spring may be exchangeable, so that compression springs with different strengths can be used as preferred by the user.

The invention claimed is:

1. A foot switch device, comprising:

a housing;

a pedal moveably mounted on the housing;

a bias element; and a switching device, wherein:

the pedal is configured to be moveable against a force of the bias element to operate the switching device, the bias element has a non-linear load deflection curve, the pedal is moveable from a rest position through an intermediate position to a switching position, and a force required to move the pedal from the rest position to the intermediate position is higher than a force required to move the pedal from the intermediate position to the switching position.

2. The foot switch device of claim 1, wherein the switching device is a binary switching device configured to switch from a first switching state to a second switching state when the pedal is moved into the switching position.

3. The foot switch device of claim 1, wherein the switching device is a proportional switching device configured to output a switching signal depending on a position of the pedal.

4. The foot switch device of claim 1, wherein the bias element comprises a tension spring.

5. The foot switch device of claim 4, wherein the bias element further comprises a compression spring.

6. The foot switch device of claim 5, wherein a force of the compression spring is lower than a force of the tension spring or a leaf spring when the pedal is moved from the rest position to the intermediate position, and wherein the force of the compression spring is equal to or higher than the force of the tension spring or the leaf spring, when the pedal is moved beyond the intermediate position.

7. The foot switch device of claim 4, wherein the pedal is moveable about a pedal pivot axis, and the tension spring is mounted between a first fixing point at the housing and a second fixing point at the pedal.

8. The foot switch device of claim 7, wherein the tension spring extends along a straight line between the first fixing point and the second fixing point when the pedal is moved from the rest position to the intermediate position, and wherein the tension spring is deflected at the pedal pivot axis when the pedal is moved beyond the intermediate position towards the switching position.

9. The foot switch device of claim 1, wherein the bias element comprises a leaf spring.

10. The foot switch device of claim 9, wherein the leaf spring is a clicker frog spring.

11. The foot switch device of claim 9, wherein the leaf spring has a V-shaped configuration, with a first arm being fixed to the pedal, a vertex resting on the housing, and a second arm moveably resting on the pedal.

12. The foot switch device of claim 1, wherein the foot switch device comprises a plurality of pedals moveably attached to the housing, and a separate bias element associated with each of the pedals.

* * * * *